United States Patent [19]
Droske

[11] 3,789,690
[45] Feb. 5, 1974

[54] OVERLOAD RELEASE DEVICE FOR A MOTOR DRIVE

[75] Inventor: Donald J. Droske, Monroe, Mich.

[73] Assignee: Dura Corporation, Southfield, Mich.

[22] Filed: Nov. 17, 1972

[21] Appl. No.: 307,617

[52] U.S. Cl. ............... 74/411, 64/27 NM, 74/425, 403/227, 403/228
[51] Int. Cl. ....... F16h 57/00, F16h 1/16, F16d 3/14
[58] Field of Search ...... 287/52, 85; 74/405, 411 A, 74/425; 64/7 NM

[56] References Cited
UNITED STATES PATENTS

| | | | |
|---|---|---|---|
| 3,386,264 | 6/1968 | Paulsen | 64/27 NM |
| 3,496,791 | 2/1970 | Gabriel | 74/411 X |
| 3,496,802 | 2/1970 | Cork et al. | 74/411 X |

*Primary Examiner*—Leonard H. Gerin
*Attorney, Agent, or Firm*—Hill, Sherman, Meroni, Gross & Simpson

[57] ABSTRACT

An overload release device for an electric motor drive of the type wherein a driving gear is connected to a driven gear through an overload release having compressible cylinders received in a cavity in the driving gear and contacting adjoining lands on a hub member has the hub member formed as an integral die casting around a knurled or splined portion of the pin or shaft. The assembly has a resilient washer forming a primary seal with a raised axial ridge on a flange of the hub and a secondary lip peripheral seal against an adjoining housing wall. A plastic driving gear has a plurality of inwardly directed angular resilient tongues which snap over abutment lands on the hub to limit axial separation of the driving and driven gears with respect to one another. Further, the tongues are wider than the abutment lands and provide radial walls engageable with the abutment lands to limit angular movement between the hub and the driving gear.

26 Claims, 4 Drawing Figures

Patented Feb. 5, 1974
3,789,690
2 Sheets-Sheet 1
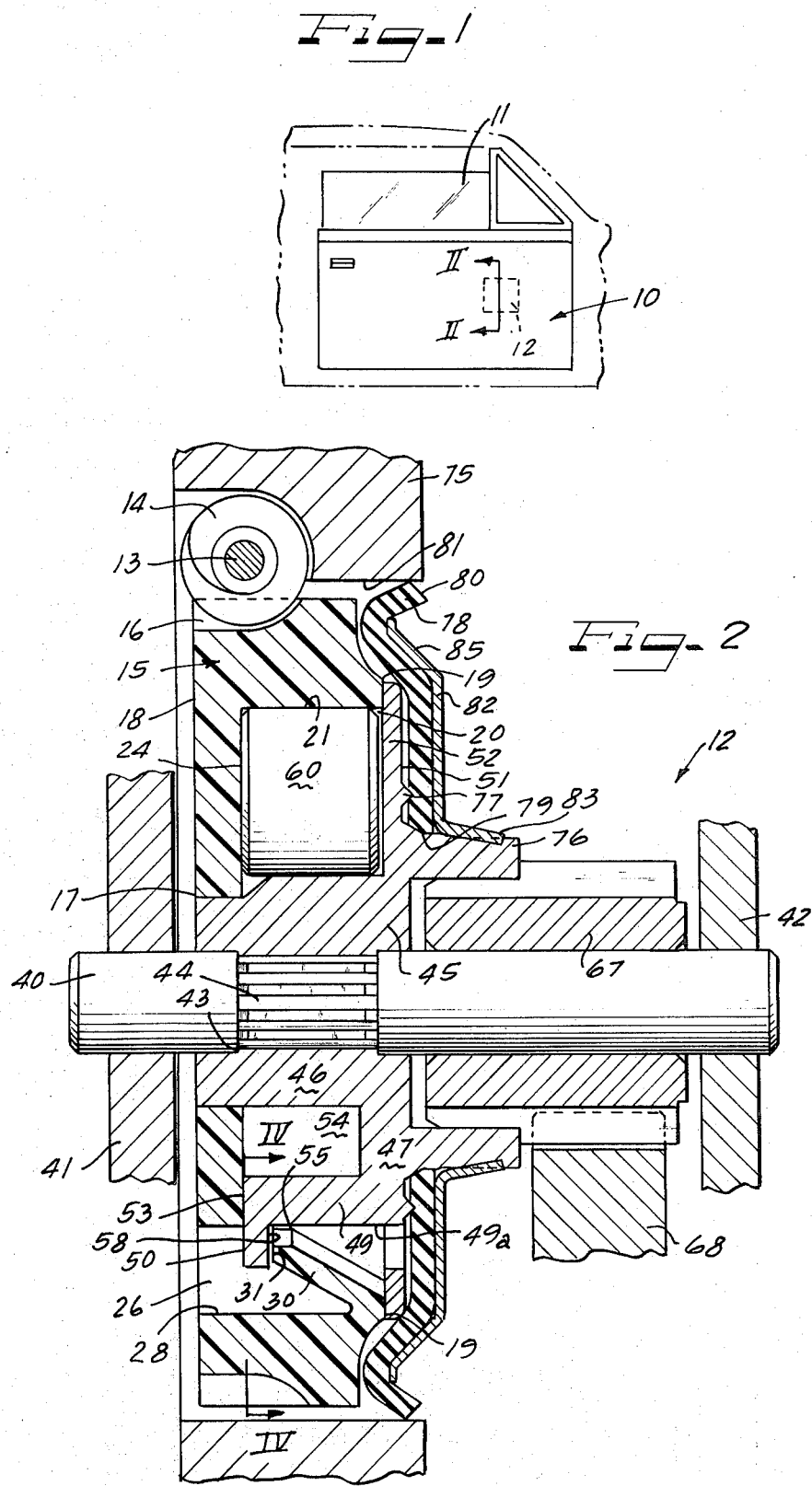

OVERLOAD RELEASE DEVICE FOR A MOTOR DRIVE

BACKGROUND OF THE INVENTION

1. FIELD OF THE INVENTION

This invention relates to power transmission devices and more particularly to a momentary overload release device.

2. PRIOR ART

Drive trains, and particularly electric motor drive trains, often require an intermediate device capable of absorbing a momentary overload. A particular example of the need for such devices, and one in connection with which the present invention may be practised, is found in the electric motor drive train of an automobile window raising and lowering device. Since the extent of movement of the window is limited in both directions, it is possible for the electric motor to remain engaged by the operator when the limit of movement of the window is reached. It is normal to stall the electric motor when the limit of movement is reached. If a direct drive connection with no absorbing ability is provided between the window moving gearing and the electric motor, numerous disadvantages can arise. For this reason, it has been found desirable to put a limited torque absorbing or lost motion overload release device in the drive train between the motor and the window gearing.

A device having these characteristics has been provided in the drive train of prior art units. Such a device may include a driving gear which is acted upon by the electric motor and which is connected to a pinion having a driven gear attached thereto. The connection to the pinion is through a plurality of compressible members, such as polyurethane cylinders. Normally, the driving gear is a ring gear having a triangularly shaped interior with the cylinders received at the apices of the triangle. The pinion has a hub portion with three lobes thereon normally disposed intermediate the apices of the triangle and having sloping faces contacting the cylinders. Thus, torque is transmitted from the rotating ring gear through the cylinders which are entrapped in the apices by contact with the lobe walls to the hub which functions as a pinion with the driven gear attached thereto. The driven gear is then geared to the window operating mechanism. When the window has reached the limit of its travel, the pinion gear will stop. At this point, the cylinders may compress slightly as they are forced between the sloped wall of the lobes of the hub and the walls of the cavity at the apices, thereby reducing the dimensions between the periphery of the hub and the inner periphery of the ring gear. As their resistance to compressing increases with compression, the ring gear is brought to a halt. After release of the motor, the resilient nature of the cylinders will return the assembly to a static condition. Thus, the device functions as a momentary flexible overload release.

A device having many of the features above described is illustrated in U.S. Letters Pat. No. 3,554,045 to Joseph C. Littmann, issued January, 1971.

While the prior art devices worked satisfactorily, disadvantages occur in both manufacturing and operation. It is desired that a seal be provided between the exterior of the pinion and the interior cavity of the driving gear. This requires both sealing from the outside and along the pinion shaft. Additionally, difficulty has arisen in providing adequate stoppage to prevent axial movement of the driving gear and the pinion, while still allowing angular movement. It would be an advance in the art if a new construction could be devised having advanced sealing characteristics and integral means for preventing axial movement of the parts while at the same time minimizing construction and assembly costs, while maximizing life expectancy of the unit.

SUMMARY OF THE INVENTION

The present invention overcomes the disadvantageous features of the prior art and provides a simplified construction having the desired sealing features and axial movement limitation means as well as circumferential movement limitation means. The advantages are derived from a combination of novel mechanical structure and manufacturing methods.

In a construction according to my invention, which is hereinafter detailed in a specific embodiment, the driving gear is formed of a plastic, such as a nylon having an angled gearing on its outer diameter face for meshing with a helix gear operated by the motor. The inner diameter of the driving gear has a triangular shaped cavity having rounded apices. The legs of the triangular shaped cavity have radially outwardly directed recesses therein with spring tongues projecting radially inwardly from the outer diameter of the recesses. The recesses are bound by radial walls at the circumferential ends of each recess and the tongues are preferably arcuately curved. The triangular cavity extends into the body of the gear from one axial end thereof and terminates in a radial wall adjacent the other axial end which reduces down to a smaller-diameter central opening. A pinion is provided having a shaft with a hub thereon and a gear axially adjacent the hub. The shaft is provided initially with a reduced-diameter knurled section and the hub is thereafter die cast around the shaft in the area of the knurled section. Die casting of the hub around the shaft provides, in effect, a one-piece shaft and hub, thus sealing the shaft and hub connection. The hub has a plurality of radial lobes projecting thereof with curved leading and trailing edges. The lobes terminate in outer-diameter flanges which index with the recesses in the driving gear. The flanges form abutment surfaces for the tongues of the driving gear and the back wall of the cavity. A radially extending disc portion of the hub forms an abutment surface with one axial end wall of the driving gear. Thus, the driving gear is entrapped on the hub between the tongues and the disc, thereby preventing axial movement of the driving gear and hub.

The disc of the hub has an axially extending ridge ring thereon. A sealing washer is received around a central axial collar portion of the hub and is pressed against the ridge by a retaining ring affixed to the central axial collar portion of the hub to provide a primary seal. A secondary seal is formed at the periphery of the washer. The secondary seal is a peripheral lip seal against a housing member in which the device is received.

It is therefore an object of this invention to provide an overload release device wherein the driving gear is restrained against axial movement with respect to the driven gear.

It is another and more particular object of this invention to provide an overload release device wherein the driving gear is received around a hub portion of the driven gear shaft and snap interlocking means are provided to prevent axial movement of the driving gear with respect to the shaft.

It is another particular object of this invention to provide an overload release device wherein the driven gear is a shaft-mounted pinion, the shaft having a hub portion projecting radially thereof, the hub portion formed integrally with the shaft by die-casting around a shaft.

It is yet another object of this invention to provide an overload release device having a driving gear and a driven gear coupled together through compressible members, the driving gear surrounding a hub portion cast on the driven gear shaft, the driving gear and hub having interlocking means preventing movement of the driving gear axially of the hub.

It is another specific object of this invention to provide an overload release device for a motor drive, the device having a driving gear with an internal chamber receiving compressible members and a driven gear shaft mounted hub having projections extending into the internal chamber with a seal sealing the chamber and driving gear, the seal including a washer received around a portion of the hub and in contact with a raised ridge on a surface of the hub, creating a primary seal, the seal member having a peripheral lip seal portion in contact with the housing.

BRIEF DESCRIPTION OF THE DRAWINGS

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure, and in which:

FIG. 1 is a side view of a vehicle door equipped with the overload release device of this invention, as shown by dotted lines;

FIG. 2 is a fragmentary cross-sectional view of the overload release device of this invention, with a section taken along the lines II—II of FIG. 1;

DESCRIPTION OF THE PREFERRED EMBODIMENT

Figure 3:
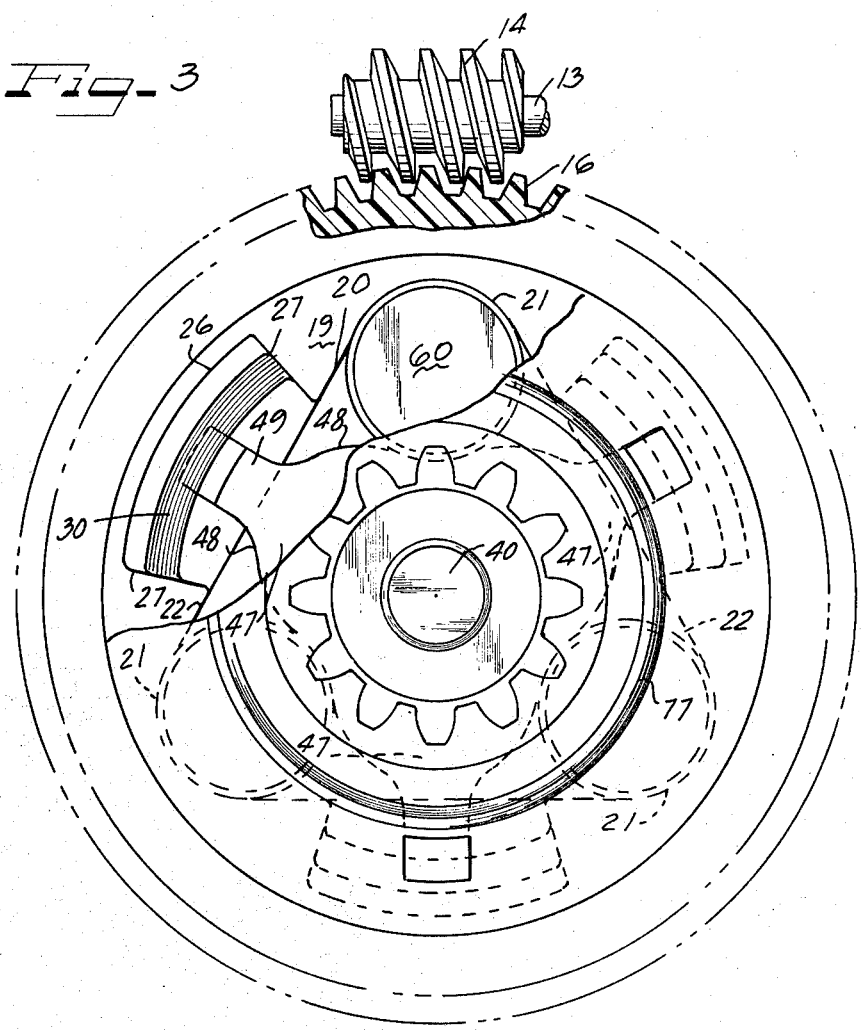
FIG. 3 is a fragmentary end view with portions broken away in a way to show underlying portions of the release device of this invention.

FIG. 1 illustrates a vehicle door 10 having a window 11 mounted therein for movement upwardly and downwardly. The window is controlled by an electric motor having a drive train including an overload release device 12 according to this invention.

As illustrated in FIG. 2, the electric motor drives a shaft 13 to which is connected a worm 14 having helix teeth thereon. The worm drives a driving gear 15 having angled teeth 16 on the outer diameter thereof contacting the worm gear 14. The driving gear is preferably a plastic such as nylon or glass-filled nylon. The driving gear is cup-shaped having a peripheral wall 16, a central axial opening 17 and axial ends 18 and 19. Extending into the body of the gear from the axial end 19 is a triangular-shaped cavity 20.

Figure 4:
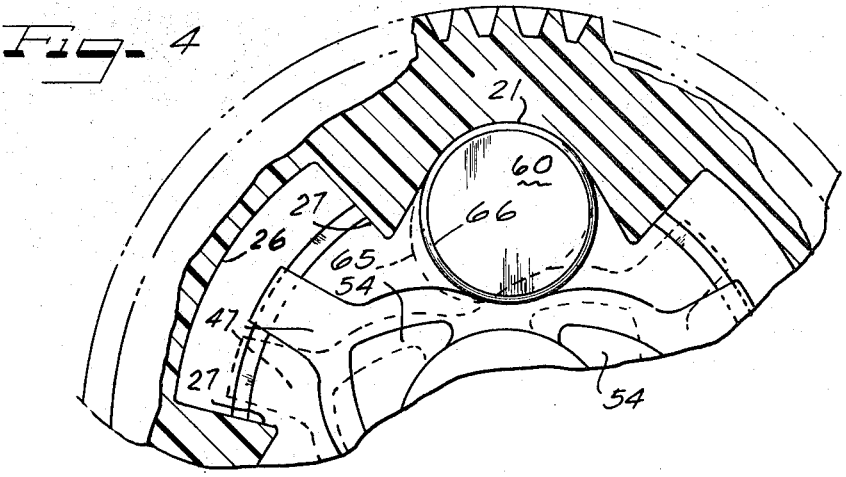
FIG. 4 is a fragmentary view similar to FIG. 3, illustrating relative movement of the hub and driving gear.

As best illustrated in FIGS. 3 and 4, the triangular-shaped cavity 20 has rounded apices 21 defined by straight leg portions 22. The triangular-shaped cavity terminates at a back wall 24. Intermediate the apices 21 are recesses 26 extending radially outwardly from the legs 22. The recesses are bounded at circumferential ends by radial walls 27.

As best illustrated in the lower portion of FIG. 2, each of the recesses 26 has an outer diameter wall 28 extending between the circumferential end walls 27. A tongue 30 extends radially and axially into the recess 26 from the axial end 19 of the gear 15. The tongue terminates at a point 31 intermediate the axial ends 18 and 19 and spaced radially inwardly from the outer diameter wall 28 of the recess 26 so that the body of the tongue is cantilevered over a portion of the outer diameter wall 28. The tongue, as illustrated in FIG. 3, is circumferentially curved on a radius from the center of the gear. The tongues are formed integrally with the gear.

A shaft 40 is received through the center axial opening 17 and rotatably mounted in the door 10 in bearing supports 41 and 42. The shaft 40 is formed with a reduced-diameter portion 43 intermediate its axial ends which is splined as at 44. A die-cast metallic hub member 45 is cast in place around the shaft in the area of the spline and overlies full diameter portions at each end of the splined section. By die-casting the hub 45 around the pin, a one-piece unit is provided allowing no leakage path to exist along the shaft through the hub. This method eliminates heretofore encountered sealing problems in prior art devices.

The hub 45 has a central portion 46 from which project three equidistantly circumferentially spaced lobes 47. Each lobe has broad S radially extending cam surface walls 48 defining its circumferential edges, the walls of each lobe terminate in a radially projecting portion 49 extending beyond the cam surface wall, the portions 49 terminate in an axial outer diameter wall 49a. The wall 49a has a further radially outwardly projecting ledge 50 at one axial end of the wall 49a.

One axial end 51 of the hub extends radially outwardly in a disc 52 which overlies a portion of the axial end wall 19 of the gear 15. The other axial end wall 53 formed by the axial end of the lobes of the hub has recesses 54 therein in the area of the lobes 47, whereby the lobes are fomed as a spider closed at one axial end by a continuous wall.

The hub is inserted into the central cavity of the gear 15 with the lobes extending into the recesses 26. The radial ledge 50 at the end of each of the lobes projects beyond the inner diameter 55 of the tongues 30. The tongues are resilient due to their cantilever attachment and are pressed radially outwardly during assembly of the hub into the cavity until the radial ledge 50 is passed beyond the axial end of the tongues. At this point, the tongues snap radially inwardly. Thus, the driving gear 15 is restrained against axial movement on the hub by contact between the end 31 of the tongue and a radially extending wall 58 at the axial end of the flange 50. The gear 15 is restrained against axial movement in the other direction by contact between the disc extension 52 of the hub and the axial end wall 19 of the gear 15 and by contact between the axial end wall 53 of the hub lobes and the bottom wall of driving gear cavity 20 in the area of the recesses.

As best illustrated in FIG. 3, the circumferential width of the radially outermost portions 49 of the lobes is less than the circumferential width of the recesses 26 into which they project, so that the hub is circumferentially rotatable with respect to the gear 15 until contact between the portions 49 of the lobes and the circumferential ends or radial walls 27 of the recesses 26.

Three cylinders 60 of resilient material such as a polyurethane are positioned in the spaces between the bottom wall 24 of the central cavity of the driving gear in the area of the apices 21 and the disc 52 of the hub. The cylinders 60 are radially contacted by the walls of the apices 21 and the central portion 46 of the hub intermediate the lobes. The recesses into which the cylinders 60 fit are defined by the curved side walls 48 of the lobes. Therefore, any relative rotational movement between the driving gear 15 and the hub 45 will cause contact between the side walls 48 of the lobes and the cylinders in the spaces at each apex. This will tend to impart a rotation to the cylinders which, however, will be entrapped in the limited space at the apex. As further relative rotation occurs, the space will become smaller and the cylinders will be deformed as at 65 in FIG. 4 from their original cylindrical shape illustrated at 66 in FIG. 4. The deformation will absorb torque between the driving gear 15 and a driven pinion gear 67 mounted on the shaft 40 beyond the axial end wall 51 of the hub. Thus, when the worm 14 is rotating at a point in time when the pinion gear 67 is not, the cylinders 60 act as an overload absorber.

In the embodiment illustrated in FIG. 1, the window 11 is operated through a gearing 68 meshed with the pinion gear 67. Thus, when the window has reached its limits of travel, the device 12 functions as an overload release device. After the electric motor driving worm 14 has been de-energized, the resilient nature of the cylinders 60 will return the device 12 to its static condition illustrated in FIG. 3.

The device 12 is mounted within a housing member 76 surrounding the majority of the hub and the gear 15. It is desirable to seal this area from the exterior. In order to do this, I first provide the die case hub 45 on the shaft 40, thereby preventing any leakage path along the shaft. Second, I provide a collar 76 extension of the hub from the axial end 51. The collar 76 is spaced from the shaft 40 and may overlie a portion of the pinion 67. Radially outwardly from the collar 76, I provide a peaked axial bead or rub 77 extending circumferentially around the collar and projecting axially of the end 51 of the hub. The peaked bead or rib 77 is formed as an integral portion of the hub. A flexible seal ring 78 formed of material such as neoprene overlies the axial end 52. The seal ring 78 has a central opening 79 received around the collar 76 and an outer diameter 80 normally extending beyond the opening 81 of the housing 76 into which the device 12 is received. A retaining ring 82 having a central opening formed by an axial flange 83 is pressed against the sealing ring 78 to force it into contact with the bead or rib 77. The inner diameter of the retaining ring 83 at the flange is less than the outer diameter of the collar 76 providing a primary seal at the point of contact between the retaining ring and the collar. The retaining ring is press-fit around the collar.

As illustrated in FIG. 2, the retaining ring 83 may bite into the end of the collar to provide a first sealing point. The retaining ring is forced onto the end of the collar to a point where the sealing ring 78 is forced against the bead or rib 77 forming a secondary sealing point. The retaining ring has an outer diameter portion 85 projecting at an axial angle and terminating radially inwardly of the opening 81 in the housing. This forces the sealing ring 78 at its outer diameter 80 into the opening 81 defined by the housing 75, and deforms it to a dished configuration, as illustrated, where it forms a lip seal with the wall of the opening 81. Thus, a three-point seal is provided for the area of the device 12 to be sealed, the first seal point being provided at the press-fit of the retaining ring to the collar, the secondary seal formed at the bead or rib 77 and a tertiary seal formed at the periphery of the sealing ring 78 in contact with the housing member 81.

It can therefore be seen from the above that my invention provides an overload release device for a motor drive wherein the release device includes a driving gear surrounding a shaft which has a hub portion die cast integrally therewith, the shaft carrying a driven gear. The driving gear has a cup-like cavity extending thereinto from one end face, the cavity being primarily triangular with rounded apices. The hub has a portion received in the cavity, the portion having three lobes thereon projecting radially outwardly, and terminating in end portions which extend into recesses extending radially outwardly from the triangular cavity of the driving gear. The lobes have cam surfaced walls defining a space which includes the apices of the triangular shaped cavity and which is defined on its sides by the cam surfaces of the lobes. Resilient cylindrical members are received in the spaces and form a drive connection between the driving gear and the hub which is capable of absorbing lost motion due to the deformability of the cylinders. Excess torque is accommodated by contact between the ends of the lobes and the circumferential end walls of the recesses of the driving gear into which they project. The driving gear is mounted on the hub and restrained against axial movement thereof by contact between tongues which project radially and axially inwardly into the recesses and contact radially outwardly projecting flanges on the ends of the lobes. The tongues are deformable during installation of the hub into the central cavity of the driving gear. Axial movement is also prevented between the driving gear and the hub by contact between axial end walls of the hub and the bottom wall of the cavity and by contact between an axial end wall of the driving gear and a radially extending disc portion of the hub. The central cavity is sealed by a seal ring positioned on the outside of the disc which contacts a raised bead or rib on the disced portion of the hub and which is pressed thereagainst by a retaining ring which is press-fit around an axially extending collar of the hub. A tertiary seal is formed between the end of the sealing ring and the wall of a housing cavity in which the device is received, the periphery of the sealing ring being deformed into a lip seal by contact with the cavity wall of the housing.

I claim as my invention:

1. An overload release device comprising: a driving gear, said driving gear having axial ends and a peripheral surface with gearing on the peripheral surface, a central cavity extending into the gear from one axial end, a plurality of tongues extending radially and axially into the cavity from adjacent said one axial end and terminating in free ends, a shaft through said driving gear, a hub member on said shaft, portions of said hub member within said cavity and second portions of said hub member overlying the free ends opposite the one axial end whereby the driving gear is restrained by the tongues against axial movement independent of the hub in at least one direction.

2. The device of claim 1 wherein said hub member has a first face opposing in overlying relationship a second face of said driving gear and restricting axial movement of the driving gear independently of the hub in a direction opposite the restraint imposed by the overlying free ends and second portions.

3. The device of claim 2 wherein the first face is an axial end wall of the hub and the second face is a bottom wall of the central cavity.

4. The device of claim 3 wherein the first face is an axial end face of a disc projecting radially of the hub and the second face is an axial end wall of the driving gear.

5. The device of claim 2 wherein the hub has a portion thereof projecting axially beyond said one axial end of the driving gear including a radially extending disck, said disc overlying portions of said cavity, a sealing ring received around portions of said hub and overlying the said disc opposite the said cavity, means pressing said ring into contact with a portion of said disc, and means retaining the ring on the said hub.

6. The device of claim 5 wherein the portion of the said disc contacting the said washer includes a circumferential axially projecting raised bead.

7. The device of claim 6 wherein the said device is received in juxtaposition to a housing member having an axially extending peripheral wall encircling the device, and the periphery of the sealing ring is pressed against the axial wall in a lip seal.

8. The device of claim 7 wherein the hub has an axial collar projecting beyond the disc away from the cavity, the sealing ring has an inner diameter received around the collar, the retaining means is a washer received around the collar, the washer having an inner diameter press fit against the collar creating a seal in the area of the press fit, and the retaining means urged against the sealing ring.

9. The device of claim 8 wherein the outer periphery of the retaining means is angled to bend peripheral portions of the sealing ring away from the retaining means whereby the lip seal formed at the periphery of the sealing ring is an angled lip seal.

10. The device of claim 9 wherein the said hub is die cast on a shaft around a knurled portion of the shaft.

11. The device of claim 1 wherein the tongues are resilient and are bent from their normal state during insertion of the hub into the central cavity and thereafter returned to their normal state overlying the said second portions of the said hub.

12. An overload release device comprising: a housing, bearing supports in said housing, a shaft suspended from said bearing supports, a driving gear encircling said shaft, a hub portion on said shaft, a driven gear on said shaft, a resilient connection between said driving gear and said hub portion effective to transmit torque from said driving gear to said hub connection, said driving gear having axial end walls with a cavity extending into the body of the driving gear from one axial end wall, portions of said hub received within said cavity, tongues formed integrally with said driving gear projecting into said cavity and terminating in spaced relation to a wall of said cavity, second portions of said hub having an outer diameter of greater dimension than the inner diameter of said tongues, and said portions entrapped between a back wall of said cavity and the said tongues to prevent axial movement of the said driving gear on the said hub.

13. The device of claim 12 wherein the said tongues are deformable to increase the dimension of their inner diameter whereby the said second portions of the said hub can be inserted into the said cavity by deforming the tongues, said tongues being resilient to return to their normal state after deformation.

14. The device of claim 13 wherein the driving gear is constructed of a plastic and the hub is constructed of a metal die cast around the shaft.

15. The device of claim 14 wherein the said housing has a peripheral wall encircling the driving gear and a portion of the hub when the said shaft is mounted in the said bearings, the said hub having a disc portion extending radially outwardly from a central portion of the hub into overlying relationship with an axial end wall of the driving gear radially outwardly of the cavity whereby the said disc overlies the cavity, an axial rib or bead on said disc remote from the said cavity, a resilient sealing ring received around said shaft having an inner diameter engaging the axial projection on said shaft and having a bottom face engaging the said bead in sealing relationship.

16. The device of claim 15 wherein the outer periphery of the said sealing ring forms a lip seal against the peripheral wall of the housing.

17. The device of claim 16 wherein a retainer ring is received over a portion of the said housing and is effective to maintain the sealing ring against the said rib or bead and the periphery of the said sealing ring against the said peripheral wall of the housing.

18. The device of claim 17 wherein the retaining ring is press-fit around an axially projecting collar of said hub.

19. The device of claim 18 wherein the outer periphery of the said retaining ring extends at an angle to the remainder of the ring and deforms the sealing ring.

20. In an overload release device for a motor drive of the type having inner and outer relatively rotatable parts confining one or more cylinders for compression to afford a flexible overload release, the improvement of: a hub made of metal and constituting the inner part; a plastic gear constituting the outer part; and means to keep the plastic gear from moving axially and separating from the metal hub comprising a plurality of circumferentially spaced apart tongues on one part and a radial wall on the other part sized and shaped to afford snap-in assembly.

21. In an overload release device for a motor drive of the type having inner and outer relatively rotatable parts confining one or more cylinders for compression to afford a flexible overload release, the improvement of: a hub made of metal and constituting the inner part, a plastic gear constituting the outer part, measn to keep the plastic gear from moving axially and separating from the metal hub comprising a plurality of circumferentially spaced-apart tongues on one part and a radial wall on the other part sized and shaped to afford snap-in assembly; said hub member and said plastic gear having interfitting slot and finger means to provide a stopping means for prescribing limitations of relative angular displacement.

22. In an overload release device for a motor drive of the type having inner and outer relatively rotatable parts confining one or more cylinders for compression to afford a flexible overload release, the improvement of: a hub member constituting the inner part; a gear constituting the outer part; and a housing having a circumferential wall circumscribing said inner and outer parts; said hub member having an axially projecting annular rib on one radial face thereof; and a flexible rubber sealing washer overlying said one radial face and engaged by said rib to establish a primary seal, and retainer means connected to said hub and overlying said washer to retain same in assembly therewith.

23. In an overload release device for a motor drive of the type having inner and outer relatively rotatable parts confining one or more cylinders for compression to afford a flexible overload release, the improvement of: a hub member constituting the inner part; a gear constituting the outer part; a housing having a circumferential wall circumscribing said inner and outer parts; said hub member having an axially projecting annular rib on one radial face thereof, a flexible rubber sealing washer overlying said one radial face and engaged by said rib to establish a primary seal, retainer means connected to said hub and overlying said washer to retain same in assembly therewith, said washer having peripheral edges overlying the circumferential wall of said housing and deformed at a re-entrant angle to engage said wall and form together therewith a lip seal.

24. In an overload release device for a motor drive of the type having inner and outer relatively rotatable parts confining one or more cylinders for compression to afford a flexible overload release, the improvement of: a hub member constituting the inner part; a gear constituting the outer part; a housing having a circumferential wall circumscribing said inner and outer parts; said hub member having an axially projecting annular rib on one radial face thereof; a flexible rubber sealing washer overlying said one radial face and engaged by said rib to establish a primary seal; retainer means connected to said hub and overlying said washer to retain same in assembly therewith, said retainer means comprising an annular retaining ring having a central flange adapted to be press-fit into assembly with said hub, thereby to form a secondary seal with said inner part.

25. In an overload release device for a motor drive of the type having inner and outer relatively rotatable parts confining one or more cylinders for compression to afford a flexible overload release, the improvement of: a pin having a portion knurled to form a striated surface and a hub member integrally die cast on said pin to form a mechanically bonded sealed joint with said pin at said striated surface, the hub forming the inner part, and a plastic gear constituting the outer part.

26. An overload release assembly comprising: spaced-apart bearing means; a shaft rotatably suspended between said bearing means; said shaft having a knurled portion intermediate said bearing means with a hub die-cast around said knurled portion; said hub having three circumferentially spaced-apart radially projecting lobes with leading and trailing cam surfaces; said hub having a radially projecting disc extending beyond said lobes at one axial end of said lobes; said disc having an axially extending raised bead thereon circumferentially thereof opposite the said lobes; a plastic ring gear; said ring gear having a cup-shaped central depression; said central depression substantially triangular with rounded apices; radial recesses extending outward from said depression in the areas intermediate the apices; said recesses having bottom walls; said recesses having tongues formed integrally with the gear extending radially inward and axially into said recesses from an axial end of the gear remote from the bottom wall of the recesses; said lobes terminating in radial flanges at one axial end of the lobes remote from the disc; said flanges having outer diameters greater than the inner diameters of the tongues; said hub inserted into said central cavity with said lobes projecting into said recesses; and the flanges entrapped between ends of said tongues and said bottom walls; resilient cylinders received in spaces underlying said disc; said spaces defined by the apices walls and the cam surfaces; a housing member having a peripheral wall encircling said ring gear and at least portions of said hub including said disc; a sealing washer overlying said disc; a retainer press-fit around a portion of said hub urging said sealing washer against said bead and deforming a peripheral portion of said sealing washer in a reverse angle, said periphery of said washer forming a lip seal with said peripheral wall of said housing and a pinion gear mounted on said shaft for rotation therewith.

* * * * *